Figure 1:
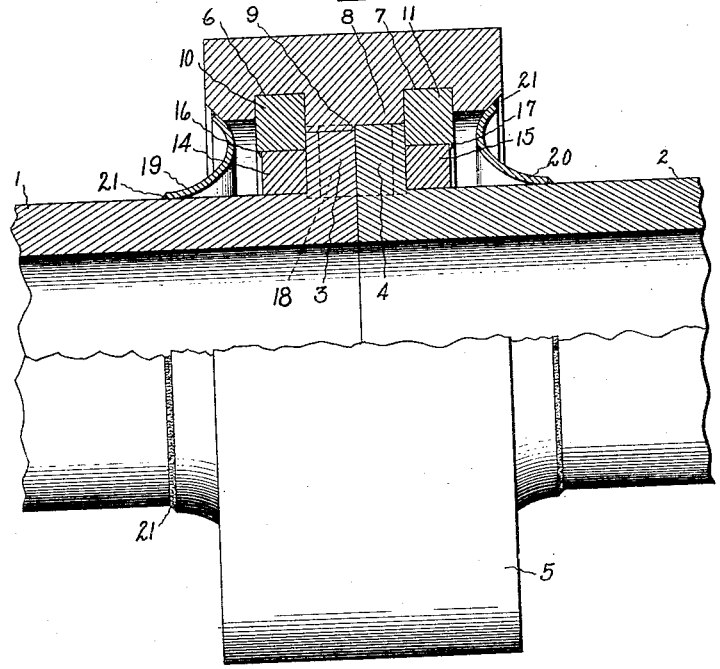

Jan. 10, 1933.  H. N. HACKETT  1,894,094
FLANGE COUPLING
Filed Oct. 28, 1931

Inventor:
Harold N. Hackett,
by Charles E. Mullen
His Attorney.

Patented Jan. 10, 1933

1,894,094

UNITED STATES PATENT OFFICE

HAROLD N. HACKETT, OF BALLSTON LAKE, NEW YORK, ASSIGNOR TO GENERAL ELECTRIC COMPANY, A CORPORATION OF NEW YORK

FLANGE COUPLING

Application filed October 28, 1931. Serial No. 571,600.

The present invention relates to couplings for connecting two flanged conduits together. In cases where couplings are applied to a conduit through which a hot elastic fluid is conveyed they are subjected to excessive strains and stresses caused by changes in temperature which often effect leakage of the coupling.

The object of the present invention is an improved flange coupling which is particularly adapted for conduits through which a medium of high temperature is conveyed, although it is not necessarily limited thereto.

For a consideration of what I consider to be novel and my invention, attention is directed to the following description and claims appended hereto in connection with the drawing which forms a part of my specification.

Figure 2:
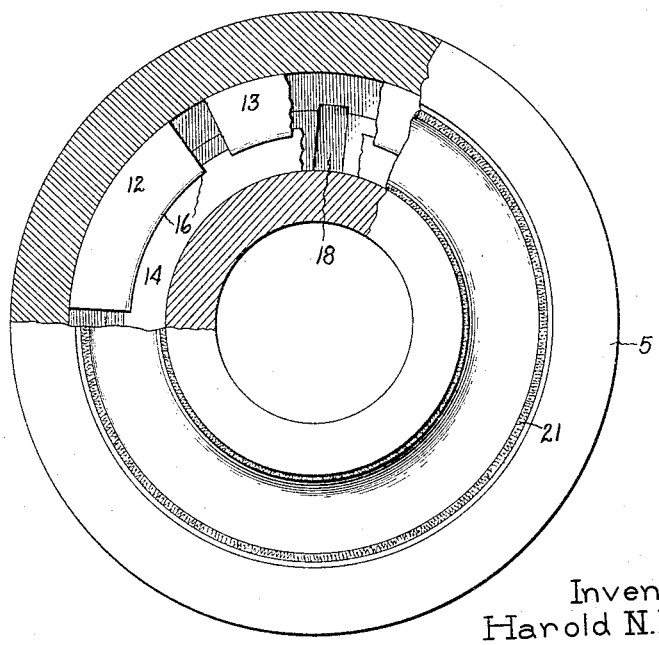

In the drawing, Fig. 1 is a front view partly in cross section of a flanged coupling embodying my invention, and Fig. 2 is a side view partly in section of Fig. 1.

Referring to the drawing, 1 and 2 represent two conduits which are provided with abutting flanges 3 and 4 respectively. Flange 3 has been shown by way of example as having an outer diameter which is smaller than that of flange 4, for a reason which will be explained hereafter.

The coupling according to my invention comprises an outer sleeve or holding ring 5, the inside of which is provided with spaced annular grooves or recesses 6 and 7. These grooves define an intermediate portion 8 of a length which is preferably of the order of the thickness of the two flanges 3 and 4. The intermediate portion is provided with a shoulder 9 which defines a left part of this intermediate portion having a diameter substantially equal to the diameter of flange 3 and a right part having a diameter substantially equal to the outer diameter of flange 4. It will be readily seen that the provision of the flanges with different diameters and the shoulder in the intermediate portion of the holding ring permits easy assembly and disassembly of the coupling as, for instance, in assembling, the holding ring has to be slidably moved only a length corresponding to the thickness of one of the flanges in order to be properly positioned. The end portions of the holding ring have preferably an inner diameter which is larger than the smaller diameter of the intermediate portion. In case the holding ring is shrunk on to the flanges the length of the intermediate portion may be made a fraction of an inch shorter than the thickness of the two flanges 3 and 4. 10 and 11 represent shear means such as split rings or keys provided in grooves 6 and 7 respectively for locking the flanges together. In the present instance I have shown these shear means as comprising a plurality of shear keys 12 and 13. 14 and 15 are split rings or segmental retaining keys for holding the sectional shear keys 10 and 11 respectively in grooves 6 and 7 respectively.

The sectional shear keys 10 and 11 may be peened over as indicated at 16 and 17 respectively in order to maintain the retaining keys 14 and 15 in constant engagement with the corresponding shear keys. 18 designates a locking device such as a key provided in a slot extending partly through the flanges and partly through the holding ring in order to prevent relative rotative movement between these parts. 19 and 20 are two annular rings of sheet metal or the like provided at the ends of the coupling and being integrally united with the holding ring and the conduits respectively whereby any leakage of the coupling is prevented. The uniting may be performed by welding, soldering, or brazing the outer peripheries of the sheet metal rings to the ends of the holding ring and their inner peripheries to the corresponding conduits as indicated at 21.

The assembling of my coupling comprises the following steps: Sliding of the holding ring over the flanges until the inner sides of the grooves 6 and 7 register with the corresponding outer faces of the flanges; inserting of key 18; inserting the shear keys 12 and 13 in the groove; assembling of the retaining keys 14 and 15, and finally the welding of the sheet metal rings 19 and 20 to the ends of the holding ring and the corresponding conduits respectively. When a medium of high temperature, such as steam, is passed through the conduit, heat is transferred to the flanges and other coupling members and causes an expansion of these parts. As the temperature inside the conduit is higher than the external temperature, a drop in temperature in radial direction of the conduit takes place and causes the flanges of the conduit to expand more than the adjacent outer coupling members. This results in a tightening of the coupling. Owing to the simple and rigid construction of the coupling, strains set up therein during changes of temperature will not affect materially the different parts. On the contrary, they are desirable as they cause tightening of the coupling and thus prevent leakage thereof.

What I claim as new and desire to secure by Letters Patent of the United States is:

1. The combination with two conduits having abutting flanges for conveying a hot fluid, of a holding ring provided with annular grooves defining an intermediate portion slidably engaging the peripheries of the flanges, and shear means seated in the grooves and engaging the outer faces of the flanges to lock the flanges together whereby the engaging surface of the flanges are forced against each other to define a seal when the conduits are heated.

2. The combination with two conduits having abutting flanges, of a holding ring provided with spaced annular grooves defining an intermediate portion opposite the peripheries of the flanges, shear keys seated in the grooves and engaging the outer faces of the flanges to lock the flanges together, retaining means for the shear keys and an annular ring provided at each end of the holding ring having its outer periphery integrally united with the holding ring and its inner periphery integrally united with the corresponding conduit to prevent leakage.

3. The combination with two conduits having abutting flanges, of a holding ring provided with spaced annular grooves and defining an intermediate portion engaging the peripheries of the flanges, shear keys seated in the grooves and engaging the outer faces of the flanges to lock the flanges together, split rings provided between the shear keys and the conduits respectively to retain the shear keys in the grooves, and an annular ring at each end of the holding ring having its outer periphery fastened to the holding ring and its inner periphery fastened to the corresponding conduit.

4. The combination with two conduits having abutting flanges with different outer diameters, of a holding ring provided with spaced annular grooves defining an intermediate portion having a shoulder and engaging the peripheries of the flanges, shear keys seated in the grooves and engaging the outer faces of the flanges to lock the flanges together, split rings between the shear keys and the conduits for retaining the keys in the grooves, and an annular ring provided at each end of the holding ring having its outer periphery welded to the holding ring and its inner periphery welded to the corresponding conduit.

5. The combination with two conduits having abutting flanges, of a holding ring provided with spaced annular grooves defining an intermediate portion engaging the peripheries of the flanges, a key provided in a slot extending partly through the holding ring and partly through the flanges for preventing relative rotative movement of these parts, a plurality of shear keys seated in the grooves and engaging the outer faces of the flanges for locking the flanges together, and a split ring for retaining the shear keys in their position.

In witness whereof I have hereunto set my hand.

HAROLD N. HACKETT.